United States Patent [19]

Schwarz

[11] 4,289,832

[45] Sep. 15, 1981

[54] CHEMICALLY-IMPREGNATED MICROPOROUS FILMS

[75] Inventor: Eckhard C. A. Schwarz, Neenah, Wis.

[73] Assignee: Biax Fiberfilm Corp., Neenah, Wis.

[21] Appl. No.: 954,982

[22] Filed: Oct. 26, 1978

Related U.S. Application Data

[60] Division of Ser. No. 780,034, Mar. 22, 1977, Pat. No. 4,153,751, and a continuation-in-part of Ser. No. 614,018, Sep. 17, 1975, Pat. No. 4,116,892, and Ser. No. 563,623, Mar. 31, 1975, abandoned.

[51] Int. Cl.$^3$ .......................... B32B 3/12; B32B 3/26; B32B 3/28
[52] U.S. Cl. .................................... 428/542; 428/357; 428/905; 428/907; 428/910
[58] Field of Search ............... 428/306, 308, 309, 910, 428/304, 357, 905, 907, 542; 426/124, 125, 129, 133, 265, 415; 264/290.02

[56] References Cited

U.S. PATENT DOCUMENTS

| | | | |
|---|---|---|---|
| 2,491,646 | 12/1949 | Coleman et al. | 260/112 R |
| 3,511,742 | 5/1970 | Rasmussen | 428/338 |
| 3,615,691 | 10/1971 | Duwien | 426/265 |
| 3,697,367 | 5/1972 | Schwarz | 428/357 |
| 3,839,516 | 10/1974 | Williams et al. | 428/910 |
| 3,843,479 | 10/1974 | Matsunami et al. | 428/910 |
| 3,867,558 | 2/1975 | Sato et al. | 426/265 |
| 4,056,639 | 11/1977 | Schwarz | 426/265 |

*Primary Examiner*—William J. Van Balen
*Attorney, Agent, or Firm*—Louis E. Marn; Elliot M. Olstein

[57] ABSTRACT

There is disclosed a novel apparatus for the selective stretching of a coated or impregnated substrate of a synthetic thermoplastic polymer or blends thereof to form an impregnated microporous film thereof.

3 Claims, 5 Drawing Figures

DRAW RATIO $= \dfrac{1}{W} = \dfrac{1}{\pi}\displaystyle\int_0^{\pi}\sqrt{1+a^2\cos^2 x}\,dx$ $a = \dfrac{\pi d}{W}$

CHEMICALLY-IMPREGNATED MICROPOROUS FILMS

This invention is a continuation-in-part of my copending applications Ser. No. 563,623 now abandoned and 614,018 filed Mar. 31, 1975 now U.S. Pat. No. 4,116,892 and Sept. 17, 1975, respectively, and a divisional of U.S. Ser. No. 780,034 (Mar. 22, 1977) now U.S. Pat. No. 4,153,751.

This invention relates to a novel process and apparatus for stretching a coated film of a synthetic thermoplastic polymer or blend thereof, and more particularly to a novel process and apparatus for producing impregnated microporous films of a synthetic thermoplastic polymer by cold drawing such a coated film.

BACKGROUND OF THE INVENTION

A microporous sheet or film is useful as a printing substrate, such as synthetic paper; as a substitute for leather; as a highly filbrillated sheet which can easily be shredded into fine fibrils to be used as substitutes for paper-making pulps, or as a filter material, such as battery spearators.

Animal materials, such as meat are contacted or treated with nicotinic acid, such as disclosed in U.S. Pat. No. 2,491,646 to obtain a more desirable color therefor. In industry, meat-interleaf paper is stacked between freshly cut steaks to prevent formation of dark brown color, and preserve the fresh red color meat during storage. The function of the porosity of the paper is to make small amounts of oxygen available to the meat pigment, myoglobin; oxygen is needed to retain the myoglobin at the red state. The chemical additive, nicotinic acid, prolongs the time for which the red color is retained by a catalytic mechanism not entirely understood. Other chemicals are known from the patent literature to produce similar effects (U.S. Pat. No. 3,867,558: gamma-pyrone; U.S. Pat. No. 3,615,691: tetrazole; U.S. Pat. No. 3,266,909: glutamic acid salt; U.S. Pat. No. 2,863,777: pyridine/ascorbic acid).

Many polymeric materials or especially blends thereof are known to undergo fibrillation and/or pore formation upon stretching or drawing. A number of such blends are described in U.S. Pat. Nos. 3,697,367 to Schwarz and 3,511,742 to Rasmussen. Such pore formation may result from different causes, such as separation of phases of incompatible polymer blends, or separation or inorganic polymer fillers like clay or titanium dioxide from the polymer matrix due to stress concentration. Most common in such systems is that the maximum pore formation effect occurs at a draw temperature which is relatively low for the particular polymer system. When the same polymer or blend thereof is stretched at higher temperatures, the pore formation diminishes and a denser film results.

At temperatures where pore formation occurs accompanied by a decrease in density, the draw tension also increases. Draw tension or yield strain also increases with increasing draw rate or operating speed, and reaches the breaking strength of the base film at speeds which are slow and uneconomical for conventional systems used for stretching or drawing of films. Operating a conventional stretching system, such as longitudinal stretching by Goudet rolls and lateral stretching by tenter frames, under tensions which approach the breaking strength of the base film often causes breaks and frequent interruptions of the process. Extrusion speeds are uneconomically slow: for instance, an acceptable draw rate of 200 cm/min in a single longitudinal draw step over Goudet rolls for a 90 wt% isotatic polypropylene—10 wt% polystyrene (See Example 1), would limit the extrusion rate (for a 3' linear die at a draw ratio of 2.0 and a film thickness of 100 micron) to 23.2 lb/hr.

In copending application Ser. No. 614,018, there is disclosed a method for fibrillating polymer blends of imcompatible polymers or filled polymers to form fibrillated or microporous structures by cold drawing at high tension such blends or polymers. Such microporous structures are very difficult to impregnate with solvents or solutions of chemicals because of the small size of the pores. Surface tension and capillary action prevent the entry of solutions. Thus, a microporous film made by the method of such parent application while usually permeable to vapors is not permeable to liquids. Permeability indicated complete open-cell pore structure of the fibrillated films.

OBJECTS OF THE INVENTION

It is an object of the present invention to provide a novel process and apparatus for stretching an impregnated film of a blend of synthetic thermoplastic orientable polymers.

Another object of the present invention is to provide a novel process and apparatus for stretching (cold draw) an impregnated film of a blend of synthetic thermoplastic orientable polymer thereof at economical production rates.

Still another object of the present invention is to provide a novel process and apparatus for stretching an impregnated film of synthetic thermoplastic orientable polymer and blends thereof to produce an impregnated, opaque, low density, microporous film or sheet.

A still further object of the present invention is to form novel impregnated microporous films of synthetic thermoplastic orientable polymers and blends thereof.

Various other objects and advantages of the present invention will become apparent from the following detailed description of an exemplary embodiment thereof with the novel features thereof being particularly pointed out in the appended claims.

SUMMARY OF THE INVENTION

In accordance with the present invention, there is provided a novel process for coating or impregnating a film of a blend of thermoplastic orientable polymer with an incompatible second phase selected from the group consisting of an incompatible polymer and an inorganic material followed by the selective stretching in a station provided with a set of grooved rollers to form an opaque, low density, porous film. The groove pattern of the rolls is generally of a sinosoidal wave wherein the coated or impregnated film is stretched in a manner to affect uniform stretching between contact points of the material to produce a material of larger dimension in the direction of stretch.

In accordance with a preferred embodiment of the present invention, there is provided a process for coating or impregnating a blend of thermoplastic orientable polymer with an incompatible second phase selected from the group consisting of an incompatible polymer and an inorganic material followed by the stretching of such a coated or impregnated film in a first and second station wherein the first and second stations are provided with sets of rolls having grooves parallel and perpendicular, respectively, to the axis of each set of rolls. The film of synthetic material is stretched in a manner to fibrillate such film to produce an opaque low density porous sheet, an impregnated micrporous sheet or film of thermoplastic material.

In a particularly preferred embodiment, a plurality of stations are arranged in a preselect manner, as determined by product requirements, e.g. a multiplicity of sets of rollers having parallel grooves, perpendicular grooves, alternating parallel and perpendicular grooves, etc.

The impregnated microporous films produced by the process and apparatus exhibit useful properties as specialty products depending on the impregnating chemicals, as more clearly hereinafter demonstrated.

BRIEF DESCRIPTION OF THE DRAWINGS.

The invention will be more clearly understood by reference to the following detailed description of an exemplary embodiment thereof in conjunction with the accompanying drawings wherein.

DETAILED DESCRIPTION OF THE INVENTION

Drive and support assemblies, timing and safety circuits and the like known and used by those skilled in the art have been omitted in the interest of clarity.

Figure 1:
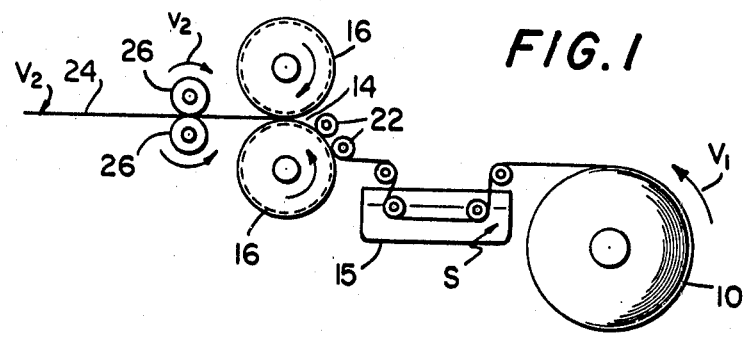
FIG. 1 is a schematic side elevational view of a portion of the apparatus and process of the present invention.
Figure 3:
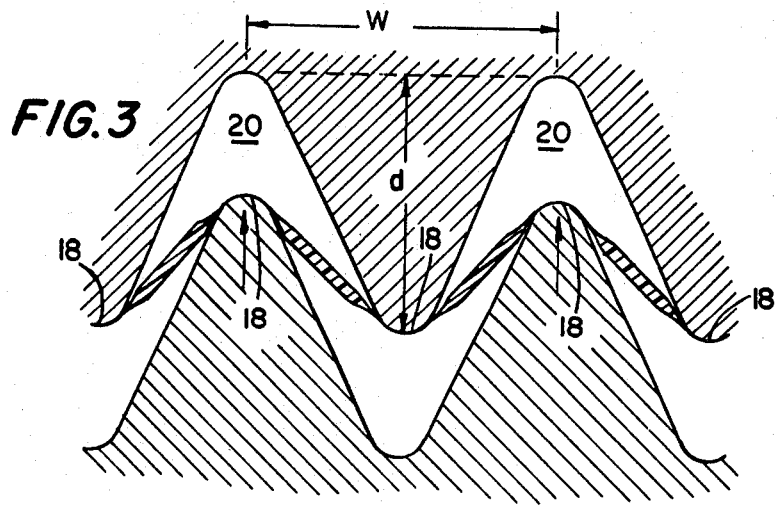
FIG. 3 is an enlarged view of the film entering the rolls.
Figure 4:
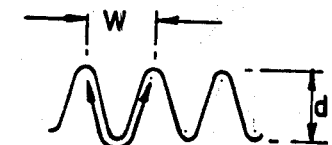
FIG. 4 graphically illustrates a sinosoidal curve.

Referring to FIG. 1, illustrating the front end of the process and apparatus of the present invention, there is provided a supply roll 10 on which is mounted a film 12 of a blend of a thermoplastic orientable polymer with an incompatible second phase selected from the group consisting of an incompatible polymer or an inorganic material. The film 12 is coursed about rollers 13 through a coating or impregnating liquid or solution, generally indicated as "S," contained in a vessel 15. The coated or impregnated film 12 is then coursed between a nip 14 of a pair of rolls 16 having a plurality of tips 18 forming grooves 20 parallel to the axis of the rolls 16, as seen in FIG. 1. The film 12 is maintained against the lower grooved roll 16 by a pair of press rolls 22 to ensure that the velocity $V_1$ of the film 12 is substantially identical to the surface velocity $V_1$ of the grooved rolls 16. The grooves 20 of the rolls 16 are intermeshed like gears, as known to those skilled in the art. As the film 12 enters the nip 14, the film 12 assumes the shape of the grooves 20 and is stretched (See FIG. 3) by a factor determined by the length of the sinus wave "l" (See FIG. 4) of the groove divided by the distance "w" between contact points of each respective groove tip, since the film 12 is prevented from slipping by the press rolls 22 to prevent the introduction of more material, as is more commonly practiced in the corrugating art.

The draw ratio (l/w) is calculated by the following equation:

$$l/w = 1/\pi \sqrt{1 + a^2 \cos^2 x} \, dx$$

where, $a = \pi d/w$; and $d =$ groove depth. Thus, for d/w ratios of 1.0, 0.75 and 0.5 the draw ratios are 2.35; 2.0 and 1.6, respectively. The longitudinal draw rate is defined by the following equation:

draw rate $= V_2 - V_1$ where
$V_1 =$ film velocity entering rolls; and
$V_2 =$ film velocity leaving rolls.

The Actual Draw Rate (ADR) for longitudinal or lateral stretching is calculated by the following equation:

$$ADR = \frac{(\text{draw ratio} - 1)V}{4 \, d/w \sqrt{R/d - \frac{1}{4}}}$$

where,
d = groove depth;
w = distance between tips;
l = length of sinosoidal wave;
the draw ratio = l/w;
V is the velocity of the film entering the nip of the rollers; and
R is the radius of the rollers.

The roller speed can be calculated as follows:

$$V = \frac{ADR \cdot 4 \, d/a \sqrt{R/d - \frac{1}{4}}}{\text{draw ratio} - 1}$$

Thus, if the critical ADR for a composition operating at about 80% of breaking tension is 100 cm/min., and d/w = 1, draw ratio is 2.25, R is 10 cm. and d = 0.3 cm., then $V_1 = ADR \cdot 18.41 = 1841$ cm/min., which is 18.41 times faster than permissible with Goudet rolls. For a 6 inch wide film die making 4 mil. film, an extrusion rate of 565 lbs/hr. can be obtained vice 30.4 lbs/hr.

The film 24 after passage through the nip 14 of the rolls 16 is pulled away by a pair of tension rollers 26 having a surface velocity $V_2$ greater than the surface velocity of the rollers 16, but not greater than a factor of the draw ratio affected in the nip 14 of the rollers 16. In accordance with the present invention, the length of the film is therefore increased by this factor.

It is noted that the film does not undergo narrowing while being longitudinally stretched or extended, as is the case with conventional roller systems. It is apparent to one skilled in the art that the film may sequentially pass through a plurality of pairs of grooved rollers 16 to further stretch lengthwise the film 24 prior to lateral stretching as more fully hereinafter described.

Figure 2:
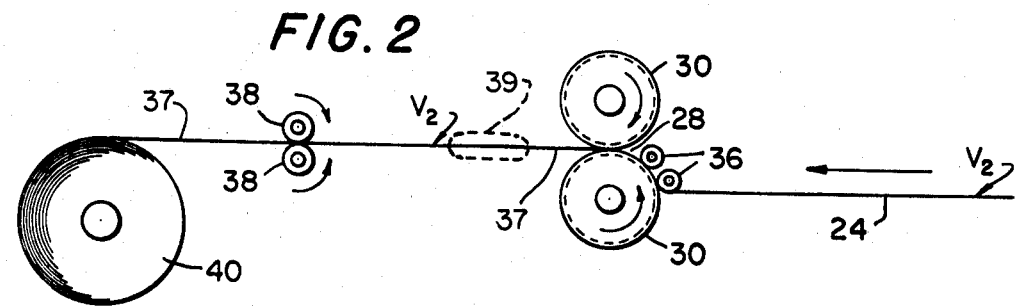
FIG. 2 is a schematic side elevational view of the remaining portion of the apparatus and process of the present invention.

Referring now to FIG. 2, the longitudinally stretched film 24 from the first station is introduced into a nip 26 formed by a pair of rolls 30 having a plurality of tips 32 forming grooves 34 parallel to the circumference of the rolls 30 in a second station of the apparatus. The film 24 is caused to be coursed into the nip 28 by a pair of press rolls 36 which holds the film 24 against the lower roll 30 to thereby prevent the film 24 from narrowing prior to introduction. Once in the nip 28, the film 24 assumes the shape of the groove pattern (See FIG. 3) and becomes laterally stretched by a factor of the draw ratio determined in a manner similar to the draw ratio discussed with reference to FIG. 1.

The crimp pattern is flattened out by stretching the sheet 37 laterally by means of tenter clamps or curved Mount Hope rolls, generally indicated as 39 such as known and used by one skilled in the art.

Figure 5:
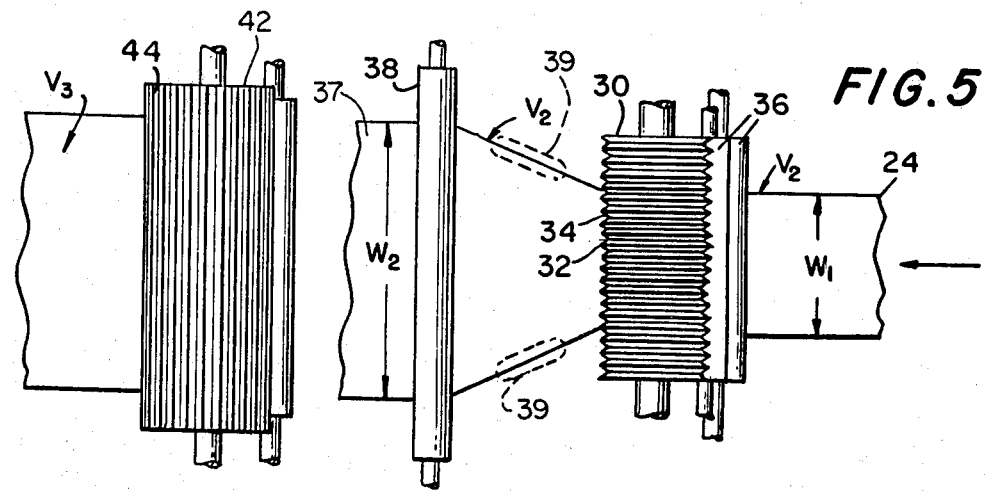
FIG. 5 is a top view of the second station followed by another first station.

In the second station, i.e. lateral stretching, the sheet 37 is wound up at about the same velocity as the feed velocity with the product being collected on a roll 40. For best results, the longitudinal and lateral stretching steps are repeated alternately through multiple passes each having a relatively low draw ratio, until the total permissible draw ratio is reached. The number of longitudinal and lateral passes, as well as the extent of the stepwise draw ratios, can be chosen so that a final film is obtained with the desired properties. FIG. 5 illustrates the film 37 being further coursed into another set of rolls 42 having grooves 44 parallel to the axis for further longitudinal stretching, which could be subsequently followed by another lateral stretching.

As hereinabove indicated, microporous filters have many industrial uses, such as bacteria or enzyme filters, or battery separators, etc. Besides wetting agents, other chemicals such as insecticides, fungicides, deodorants, desinfectants, drugs, flame retardants, etc. can be impregnated into such a microporous film for later release during use.

EXAMPLES OF THE INVENTION

Operation of the process and apparatus is described in the following examples which are intended to be merely illustrative and the invention is not to be regarded as limited thereto.

EXAMPLE I

A 0.004" thick film (4"×4") comprised of 85 wt% polypropylene and 15 wt% clay coated with a solution of a wetting agent (10 wt% polyethylene oxide in methanol) is introduced at room temperature through a pair of grooved rolls (as shown in FIG. 1). The grooves have an approximate sinosoidal shape and are 3 mm. deep and 3 mm. apart and produce a draw ratio of about 2. When the film is stretched to conform with the shape of the grooves, 8 groove tips simultaneously engage the film. The film is introduced into the nip of the intermeshing grooved rolls rotating at 60 RPM to produce a feed velocity $V_1$ of 1914 cm./min. and is wound at 3828 cm./min. The actual film draw rate is 120 cm/min. The film is passed through twice in each direction and stretched to a dimension of 6.5"×6.5" and having a thickness of 0.0025". The solvent is evaporated and the resulting film sample tested for water permeability. The film sample is cut to a circle to fit a 3" Buchnerfunnel. A suction of 20 mm. vacuum is applied to the funnel with 10 ml. of water added to te funnel. Water is filtered in 12 min. through the porous film.

EXAMPLE II

The procedure of Example I is repeated without the impregnation step and produced a sample stretched to a dimension of 6.5"×6.5" and having a thickness of 0.004 inch—calculated porosity of 39%. The film is similarly tested for water permeability in a manner substantially similar to that of Example I, however, water did not penetrate through the film in a period of 24 hours although exhibiting air permeable properties.

EXAMPLE III

A sample prepared in accordance with Example II is boiled in a wetting agent solution for one hour to affect coating of the pores by the wetting agent and to cause water to penetrate through the porous film. The solvent is dried off and the film tested for filtration of water as described above. Water would not pass through the film indicating that the wetting agent solution merely coated the pores near the surface of the film, but did not penetrate deeply into film, when applied after the stretching process.

EXAMPLE IV

Three stretched sheets of porous film of the film of Example I are stretched to test the effect of retaining the red color of freshly cut meat. One sheet (A) is not coated. A second sheet (B) is coated with a 2% solution of nicotinic acid in water, with excess solution being wiped off the surface to avoid the presence of unabsorbed chemical. A third sheet (C) is coated at room temperature with a nicotinic acid solution prior to stretching. Freshly cut cut beef is stacked on top of each other, with the film sheets interleafed between the meat surfaces. The meat surfaces in contact with film A and B turn dark within 2 hours of storage in a refrigerator at 30° F. The meat surface in contact with film C retained its fresh red color for 24 hours and is only slightly brown after 48 hours.

EXAMPLE V

Films B and C of Example IV is extracted with 50% water/50% acetone to determine the amount of nicotinic acid extracted (infrared spectroscopy of the extract and related to the film weight):

Sample B—0.05% nicotinic acid
Sample C—1.02% nicotinic acid

While the present invention has been described with reference to the passage of a film through a first longitudinal stretching station and thence a lateral stretching station, it is apparent that such stations may be altered with the film being first introduced into a lateral stretching station. Further, the film may be subjected to a plurality of longitudinally orientated stretching rolls. It will also be appreciated that the grooves need not be exactly parallel or perpendicular as long as the grooves intermesh.

It will be appreciated that the grooved roll drawing permits multiple simultaneous draw necks which allow for further actual speed where draw tension is high. At high draw tension (low temperature), the fibrillation phenomenon occurs which is highly desirable for porous films. Additionally, the grooved roll drawing permits a partial draw (draw below the natural draw ratio) in multiple stages thereby further reducing the actual draw rate and increasing the production rate. Still further defects in the base film, i.e. gels, holes, etc. are carried through the grooved roll drawing with no interruption in the process as distinguished from drawing in conventional Goudet and tenter frame drawing wherein such defects usually result in breaks and the necessity for subsequent shutdown.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. An opaque low density porous sheet comprised of a chemically-impregnated biaxially stretched film of synthetic material comprised of a blend of a thermoplastic orientable polymer and an incompatible second phase selected from the group consisting of an incompatible polymer of inorganic material or a polymer matrix having an inorganic filler.

2. The opaque low density porous sheet as defined in claim 1 wherein said chemical is an antibrowning agent for meat.

3. The opaque low density porous sheet as defined in claim 2 wherein said antibrowning agent is nicotinic acid.